April 12, 1966     R. R. BOUCHE ETAL     3,246,073
VIBRATION DAMPER FOR SUSPENDED OUTDOOR WIRES
Filed Oct. 6, 1960
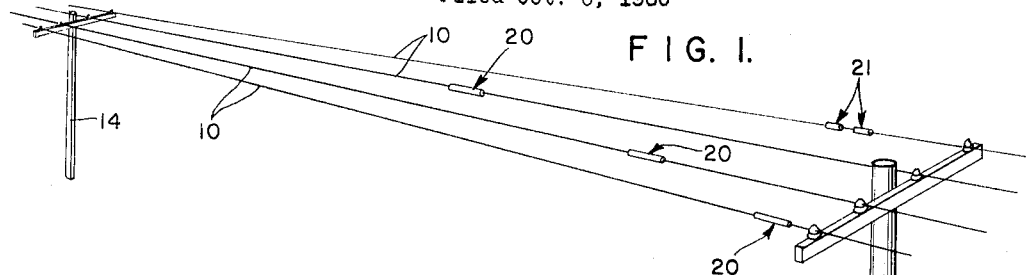
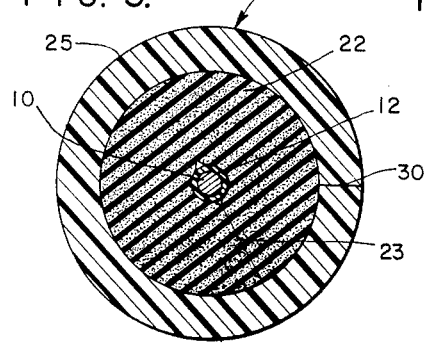
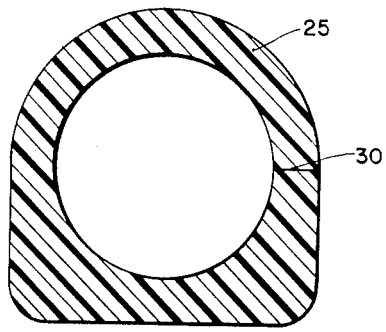
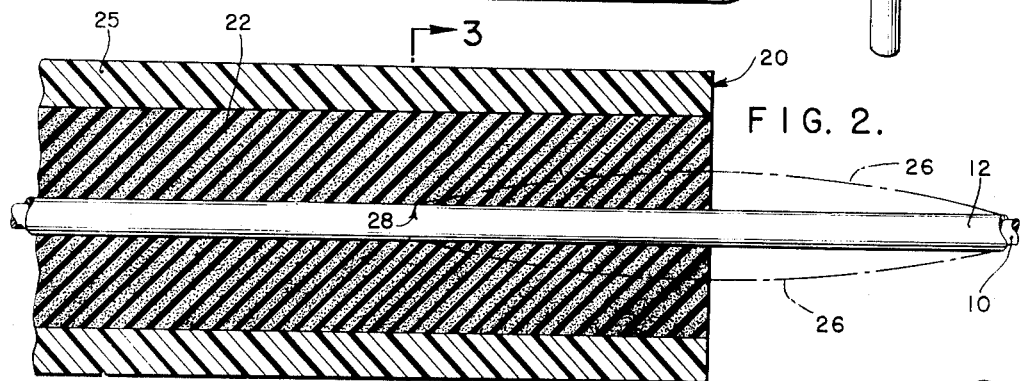
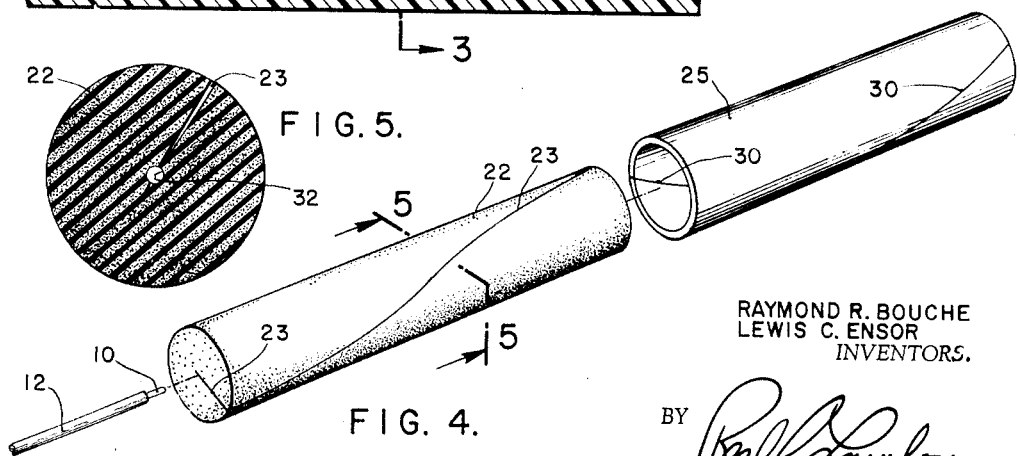
RAYMOND R. BOUCHE
LEWIS C. ENSOR
INVENTORS.
BY 
ATTORNEY.

United States Patent Office 3,246,073
Patented Apr. 12, 1966

3,246,073
VIBRATION DAMPER FOR SUSPENDED OUTDOOR WIRES
Raymond R. Bouche, 4902 Indianola Ave., La Canada, Calif., and Lewis C. Ensor, College Park, Md.; said Ensor assignor to said Bouche
Filed Oct. 6, 1960, Ser. No. 60,889
4 Claims. (Cl. 174—42)

This invention relates to dampers for employment upon suspended wires of transmission lines such as telephone wires and power distribution wires, which are exposed to wind velocities and therefore subject to vibration.

In the communication and power-distribution industries, transmission lines are commonly formed of wires that are suspended above ground between supports such as poles and towers. Such wires have diameters between about 0.1 to about 0.5 in. and the lengths of the spans between poles is of the order of 200 feet or more. One of the common hazards present in such installations involves the damaging effect of vibrations excited in the wires by wind. The spans of wires have a large number of natural frequencies that depend upon the dimensions of the wires, their mass per unit length, the tension to which they are subjected, and the distances between the poles. The frequency of vibration excited in the wires by the wind depends upon the velocity of the wind and the diameter of the wire. The principal modes of vibration are in a direction normal to the wire length and normal to the wind velocity. Usually the excitation frequency induced by the wind coincides with a resonance frequency of a span of wire. The resulting resonance causes excessive vibration, resulting in damage to the transmission line. In practice, it is found that hazards produced by wind-induced vibrations are not serious where the wind velocity is below about four miles per hour, that is, below about three to five miles per hour. But damage from such hazards are commonplace at higher wind velocities.

Our invention is based upon our discovery that effective damping of vibrations induced by wind velocities in excess of about four miles per hour can be activated by employing a simple damper which has a resonance frequency, in cycles per second (c.p.s.), substantially less than about $13/d$ where $d$ equals the diameter of the wire in inches and that little damage occurs so long as the resonance frequency of the damper is less than about $40/d$. While many types of dampers have been devised in the past for reducing damage to transmission lines caused by wind, so far as we are aware, none has been very successful, and none has come into wide use. The damper of our invention, we believe, is of more universal application than dampers of the prior art, especially since our damapers do not absorb energy merely at a single frequency or over a narrow band of frequencies, but prevent excessive vibration at all excitation frequencies for wind velocities that exceed about four miles an hour.

We have discovered that, for the purpose of systematically and successfully damping telephone and power distribution wires to avoid wind damage, there is a specific relationship between the construction of dampers to be employed and the particular suspended wires to be damped.

It is, therefore, the principal object of our invention to provide damper constructions for suspended wires, typified by telephone wire and power distribution wires, by means of which the severe damage suffered by such wires due to damaging vibrations produced by wind can be overcome.

A further object of the invention is to provide dampers for the indicated purpose which have dimensions that are directly related to the dimensions of the wire to be protected, so that effective dampers may be furnished for the particular conditions encountered. We have particularly discovered that dampers afford substantially complete protection to suspended wires when such dampers are constructed so that their natural frequencies are less than the damaging excitation frequencies of the lines to be protected.

Since the natural frequency of a damper may be readily established by known formulae, and since the excited frequencies of a given wire may be readily determined by means of well-known equations, it is a further object of the present invention to produce dampers for given uses whose constructional aspects are readily determinable by such known formulae and equations.

Other objects of the invention involve a damper construction having a central core filler which is to be disposed around the wire to be protected and which is formed of a very soft material, as hereinafter defined, of low spring constant or stiffness, which is contained within a rigid containing shell, the damper being disposed about the wire to be protected in such manner that the core material is readily compressed by the vibrations of the wire, thereby absorbing such vibrations as heat.

A further object of the invention is to provide a damper that possesses a resonance frequency below the frequency at which the wire on which it is to be used is likely to be damaged by wind-induced vibrations.

Other objects of the invention, and various features of construction thereof, will become apparent to those skilled in this art upon reference to the following specification and the accompanying drawing.

In the drawing:
FIG. 1 is a perspective view illustrating in general the use of dampers of the present invention upon telephone wires supported between two conventional telephone poles with their usual cross-bars and insulators;

FIG. 2 is a fragmentary vertical longitudinal section of one of the dampers of the present invention in position on a telephone wire to be damped;

FIG. 3 is a cross-section taken on the line 3—3 of FIG. 2;

FIG. 4 is an exploded isometric perspective view illustrating a telephone wire to be damped and provided with conventional insulation, a soft sponge rubber or similar filler helically split disposed about the telephone wire, and a relatively rigid outer shell helically split to be mounted about the filler installed upon the wire;

FIG. 5 is a cross-section of a split filler in accordance with one form of this invention prior to installation; and FIG. 6 is a cross-sectional view of an outer shell of this improvement indicating a possible modification of the form of such a shell of an overall configuration which may be used to increase the mass of the shell.

The drawing illustrates telephone wires 10 which sometimes carry a body of insulation 12 thereabout and are supported between two appropriate standards 14. Upon such wires 10, of which there may be several extending between the standards, there are mounted vibration dampers 20 of this improvement. Experience teaches that only one damper need be mounted on each span and that satisfactory results may even be achieved when a damper is located on every second or third span or so. Also excellent results are achieved when two short closely spaced-apart dampers 21 are placed apart on a wire. The combined length of a single damper 20 used on a wire and still be effective.

Each damper includes a soft sponge-rubber or other elastic core or filler 22 as previously indicated and as described more in detail hereinafter, the insulated wire 10 being mounted at the center of the core. Desirably the core 22 is longitudinally provided with a helical split 23 for easy installation upon the wire. Disposed about the soft core 22 is a rigid sleeve, or shell, 25 which may be of hard plastic or other appropriate material and offers a substantial mass or weight with respect to the soft core 22. For example, the shell 25 may have a weight about twice the weight of the core 22, but the thickness of the shell 25 at any point may be only around 1 to 2 times the diameter of the wire 10 as a whole, that is including its insulation 12, or it may be considered as having a thickness equal to about one-fourth or one-fifth the overall diameter of the soft core 22. The outside diameter of the core prior to assembly of the damper is made slightly larger than the inside diameter of the sleeve 25 in order to prevent slippage of the sleeve on the core when the damper is in use.

In practice, the outside diameter of a core 22 of typical satisfactory material will be about 3 to 7 times the overall diameter of the wire 10 as a whole, including its insulation. The ratio of the outside core diameter to the wire diameter may be as large as about 7:1; and in any event, the ratio need not be more than about 10:1.

In the most satisfactory dampers that have been tested to date, the core has been made of sponge rubber. Such material has an elasticity between 5 p.s.i. and 100 p.s.i. (ASTM Specification D-1056-58T). The particular sponge rubbers tested have been sponge neoprene rubbers having moduli of elasticity of about 20 p.s.i. to 50 p.s.i. Other very soft materials having the elastic properties of sponge rubber may also be employed. Such materials include Buna-S sponge, the well known polyurethane sponge, and other elastomers in sponge form which have elasticities in the same range. Natural rubber sponge is also usable. For cores made of materials having the elastic properties of soft sponge rubber, the diameter ratio may be only about 3:1. For cores made of stiffer, or harder, material, however, such as cork and non-sponge rubber, the diameter ratio should be at least about 5:1 in order to attain the low resonance frequency desired without increasing the weight unduly.

With this constructional arrangement, the vibration of the wire 10 is gradually attenuated by the soft core 22 as the middle of the core 22 is approached. The general manner in which the amplitude of such vibration varies along the length of the damper at one end thereof is indicated in a general way by the broken lines at 26, terminating at an inner point approximately as indicated at 28 in FIG. 2. Thus, as the wire vibrates, the filler material 22 alternately compresses and expands radially, and the energy absorbed in such action is converted to heat which is dissipated by the damper. The energy thus absorbed in the core is conducted to the shell 25 and also to the ends of the damper. The heat is dissipated from the outer surface of the damper by the action of the wind and to a lesser degree by radiation.

In practice, the wire is able to flex and to move the filler, causing the expansion and contraction above mentioned. Though the contraction and expansion is greatest at one or both ends of the damper, a slight amount of contraction and expansion may also exist near the middle of the damper. When this dynamic compression and expansion of the filler takes place, the filler absorbs energy from the wire when it is subjected to severe wind-induced vibration conditions. Also when the filler is thus displaced, it applies a resisting force to the vibrating wire as the result of the force developed in the filler by the vibratory movement of the wire. In order that this force to displace the filler will be generated, the mass of the shell 25 shall be sufficient that the shell and the outer part of the filler 22 will remain substantially motionless in space with respect to the standards 14 and the earth underlying the wires and supporting the standards.

For the purpose of the installation of the shell 25, it also is desirably helically split as indicated at 30, the material used, which may be an appropriate plastic or plastic-like moldable substance which is relatively rigid but sufficiently yieldable to permit the indicated installation upon the wire, having appropriate characteristics for this purpose. With further reference to the filter or core 22, the spiral split 23 thereof may terminate near the center as a mere split as indicated in FIGS. 3 and 4, and preferably will so terminate in order to give adequate compressive force for retention of the filler 22 and its containing shell 25 on the wire 10. However, if desired for any reason, a small cylindrical bore 32 may be formed, as seen in FIG. 5, to receive the wire, such bore, however, being of slightly smaller diameter than the diameter of the wire to be damped. Such arrangements insure retention of the unit in operating position upon the wire, and insure against dislodgement along the wire during windstorms.

The relationships above indicated with respect to the natural vibration frequency of the damper 20, the excited frequency of the wire 10, the spring constant or stiffness of the filler core 22, and the mass of the rigid shell 25, are determined from the following equations:

$$F_n = 3.13 \sqrt{\frac{K}{M}} \qquad (1)$$

and $$F_e = 3.26 \frac{V}{d} \qquad (2)$$

In these equations, the various terms have the following meanings:

$F_n$ = the natural frequency, cycles per second, of the damper;

$K$ = the spring constant or stiffness per unit length of the soft yielding core filler 22 at the center of which the wire 10 is positioned;

$M$ = the mass constant of the outer shell 25 that contains the core, that is, the mass in pounds per unit length in inches of the shell;

$F_e$ = the frequency of vibration in cycles per second excited in the wire due to the action of the wind;

$V$ = the velocity of the wind in miles per hour;

$d$ = diameter in inches of the wire 10 on which the damper is mounted.

For purposes of calculation, the mass of the core is not included in the term M. While theoretically the mass of the core contributes some to the total effective mass of the resonant system formed by the core and the shell, in practice it is found that with cores designed in accordance with this invention, the resonant or resonance frequency determined from actual tests of dampers does not differ greatly from the resonance frequency $F_n$ calculated from Equation 1.

In view of the fact that damaging vibration of transmission lines occurs only for wind velocities that exceed about four miles per hour for any wire having a diameter $d$, the minimum frequency in cycles per second at which damage occurs is given by the equation, $$F_c = \frac{13}{d} \qquad (3)$$

Best results are obtained by setting the resonance frequency of the damper 25% below this amount, that is below the minimum design frequency, $$F_d = \frac{10}{d} \qquad (4)$$

With respect to Equations 1, 2 and 3 above, the reason why the frequency of the damper $F_n$ must be lower than the frequency of the excited wire $F_e$ or $F_c$ is that when $F_n$ is smaller than $F_e$ or $F_d$, the outer shell of the damper is in fact relatively motionless in space even though the outer shell is not rigidly connected to another object such as a pole. However, a very flexible grounding wire may be attached to the shell if necessary for electrical purposes.

Though in the best embodiment of this invention the resonance frequency $F_n$ of the damper is made less than the minimum damaging frequency of the wire $F_c$, in practice many of the benefits of this invention can be attained when the natural frequency of the damper is greater than this value but less than about three times the minimum damaging frequency $F_c$, that is less than about four times the minimum design frequency $F_d$. One reason for this is that the likelihood of damage increases as the frequency of excitation of the wires increases above the minimum dangerous frequency $F_c$. Consequently, the major danger of damage can be removed by setting the resonance frequency of the damper below about $$F_e = \frac{40}{d} \quad (5)$$

In other words, the benefits of this invention are achieved when $$F_n = 3.13\sqrt{\frac{K}{M}} < \frac{40}{d} \quad (6)$$

But best results are obtained when $$F_n < F_d \quad (7)$$

By way of explanation, Equation 1 relating to $F_n$ is well known in engineering circles as defining a theoretical dynamic system involving springs and masses. Equation 2 is well established in field engineering as the Von Karman principle, being an empirical equation involving motions of fluid (either liquid or gas) about solids.

Equation 3 represents an application of the Von Karman principle when taking into account the fact that there is very little danger of damage when the wind velocity is below about four miles per hour.

The term "stiffness" represented by the factor K is a well-known term used to represent the spring constant of a material and is expressed by the approximate equation:

$$K = \frac{\pi E}{\frac{D}{d} - 1} \quad (8)$$

wherein K represents the indicated spring constant or stiffness in pounds (force) of the filler per inch of deflection per inch of damper length, D represents the outside diameter of the filler or core, $d$ is representative of the diameter of the enclosed wire, and E is the modulus of elasticity of the filler in lbs. (force)/in.$^2$.

In practice, for telephone wires of about one-tenth inch diameter, the length of a damper need be only between about six inches and twelve inches for complete effectiveness; and for power distribution wires having diameters in the order of one-quarter inch to one inch, the length of a damper need be only between about one foot and three feet. These diameter dimensions include thickness of insulation upon the wires, if any is used.

In actual practice, the lowest wind velocities at which damaging vibrations of telephone wires and other wires, such as power transportation wires, occur are about 4 miles per hour, as heretofore indicated. Effects of lower wind velocities are insignificant and commonly only higher wind velocities are of concern on the part of telephone and power companies. Such higher wind velocities commonly range up to about 30 or 40 miles per hour, but sometimes go higher. Dampers for these conditions according to this invention may be readily produced by utilizing the above equations so as to yield a damper whose natural frequency is less than four times the minimum design frequency $F_d$ of the wire to be protected.

In the best embodiments of the invention, the resonance frequency of the damper should be less than about 75% of the minimum dangerous excited frequency $E_c$ in order to substantially completely eliminate hazards due to wind-induced vibrations of wires of transmission lines. This relationship determines the design frequency $F_d$.

For example, for telephone wires, whose diameters are commonly in the neighborhood of 0.1" to 0.2" including their insulation, the lowest damaging frequency corresponding to a wind velocity of about four miles per hour is in the neighborhood of 200 c.p.s. to 100 c.p.s. respectively. For such transmission lines, a damper constructed in accordance with the best embodiment of this invention would have a natural frequency lower than about 150 c.p.s. to about 75 c.p.s. respectively. However, as mentioned above, some advantage may be achieved by employing dampers having resonance frequencies approximately four times these values. As a practical matter, though, the ideal resonance frequency to employ for dampers for use on telephone lines is about 75 c.p.s. Such dampers provide effective damping without adding excessive weight to the transmission line. In a similar way, for electric power distribution wires whose diameters are ordinarily in the range of about 0.2" to about 0.5", the minimum damaging frequency lies around 20 c.p.s. For such lines, dampers having resonance frequencies of about 15 c.p.s. or less are very effective.

An important factor to be considered in the production of dampers in accordance with this inventino is the selectin of a soft core or filler material 22 having an adequate modulus of elasticity. Such filler must have sufficient coherence to maintain itself and the damper as a whole upon the wire when in operation under high wind conditions, and yet low enough to meet the compressive conditions required for vibration absorption and to obtain a low-natural-frequency damper.

From the standpoint of the modulus of elasticity of the filler material 22, the upper limits for the modulus of elasticity for various dampers produced to accommodate wires of various diameters between the small-diameter telephone wires and large-diameter power lines would be about 1,000 lbs./in.$^2$. This upper limit would provide good damping at the higher frequencies characteristic of the smaller wires, for example, 75 c.p.s. to 600 c.p.s. in the case of the earlier-mentioned telephone wires, and down to 15 c.p.s. to 100 c.p.s. in the case of the larger-diameter power transmission lines. For the great variety of dampers which would be required, and this would include perhaps 90% of the total requirements, an upper limit of modulus of elasticity would be in the order of 500 lbs./in.$^2$. These limits would very definitely apply in all those cases where the ratio of overall diameter (D) of the filler to the overall diameter of the contained wire ($d$) is 5:1. The same would be generally true for a diameter ratio of 7:1. The most satisfactory material to use is sponge rubber or other very soft material which has a modulus of elasticity less than about 100 lbs./in.$^2$. By the use of material having the elastic properties of sponge rubber, the diameter and weight and hence the cost of dampers having any predetermined low resonance frequency can be greatly reduced. For such material, the diameter ratio can be made as low as about 3:1, but for stiffer elastic material, a diameter ratio of about 5:1 or more is required. But in any event, in practice, the diameter ratio is maintained below about 10:1 in order to maintain the weight and cost low.

The modulus of elasticity of the shell material should, of course, be a great deal larger than that of the core material. In practice, the shell material is composed of a relatively hard or stiff material having a Young's modulus of about 500,000 lbs./in.$^2$ or more.

In connection with wind velocities as previously mentioned, predominant wind velocities in the open country run between 5 m.p.h. and 30 m.p.h. These wind velocities produce typical vibration frequencies for the smaller telephone wires around 125 c.p.s. at 5 m.p.h. and up to 1200 c.p.s. for 30 m.p.h. In the case of a heavier power distribution line, 5 m.p.h. wind velocity produces around 60 c.p.s. and 30 m.p.h. produces typical frequencies around 400 c.p.s.

From the standpoint of length of damper for wires of the sizes above discussed, it is noted that the vibrations take the form of longitudinally travelling transverse waves which produce, for a given wind velocity and wire, uniformly spaced nodal points. For telephone wires, these spacings are as little as 3 inches apart for 1200 c.p.s., and as much as 30 inches apart for 125 c.p.s. For practical usage, the lengths of corresponding dampers need be only about 12 inches. A range of lengths may be between about 2 inches and 30 inches. In the case of the power distribution wires mentioned, the nodal points are about 6 inches apart for vibrations of 400 c.p.s., and about 50 inches apart for vibrations of 60 c.p.s. These results apply to wind velocities of 5 m.p.h. and 30 m.p.h. Usable damper lengths may be about 24 inches or between about 4 inches and 60 inches.

The dampers produced in accordance with the present invention, as herein described, are effective at all frequencies that are much above the resonance frequency of the damper. They are also effective at frequencies in the neighborhood of the resonance frequency, including some frequencies below the resonance frequency. It is partly for this reason that the dampers of this invention are also of some benefit when their resonance frequencies are above $13/d$ but below about $40/d$.

These dampers should not be placed on poles, but they offer the advantages that fewer poles with larger spans are usable. A reason why the dampers of this improvement may not be carried upon supporting poles or towers is that when dampers are carried upon such supports, the fillers must carry the weight of the suspended wire. Such a mounting arrangement would preclude the employment in the damper of a filler material sufficiently soft and yielding to provide a damper having a low resonance frequency as specified herein. More particularly, where vibration dampers are carried upon supports and the dampers themselves support the wires to be damped, in dampers of the filler-containing type, the filler material supporting the wires is stiff compared with the filler material of the present dampers and possesses a modulus of elasticity in the order of about 1,000 lbs./in.$^2$ or higher. In the case of rubber fillers, this excludes sponge rubber (approximately 10 degrees International Rubber Hardness) and the like and would correspond in general, for example, to a somewhat yieldable non-sponge rubber of approximately 80 degrees International Rubber Hardness. Furthermore, in the case of pole-supported dampers, the filler must have a very small diameter $(D/d)$ ratio of less than about 1.3 to rigidly secure the wire to the pole. Therefore, such pole-supported dampers do not possess the necessary characteristics for absorbing vibrations as required for the present invention. The fillers of such pole-supported dampers are not sufficiently soft and yielding to obtain a low-resonance-frequency damper, as required to achieve efficient damping in accordance with this invention.

Where rubbers or equivalent fillers appropriate for use for mounting directly on poles or other supports for the suspended wires are employed in positions on the suspended wires between the mounting supports, vibrations encountered are not absorbed by such fillers to an adequate extent, but are transmitted to the outer shells. As a result, the dampers have their natural frequencies high in the range of excited frequencies, so that damping is not achieved over a wide range of damaging frequencies as with this invention.

The above explains the function and operation of the present damper. It also explains why the filler of the damper must be of low stiffness or spring constant (K) and why the molulus of elasticity (E) must be very low and in the order of about 500 lbs./in.$^2$ or less and why materials having the elastic properties of sponge rubber are most satisfactory for attainment of best results with the present improvement. It also explains why the ratio of the overall diameter of the filler (D) to the overall diameter of the wire to be damped ($d$) must be in the range of about 3:1 to 7:1, as heretofore indicated.

As pointed out above, a damper having a resonance frequency of 75 c.p.s. is very satisfactory to use with telephone wires having dimensions of about 0.1 to about 0.2 inch. A damper satisfactory for this purpose has a length of 6" to 10" and has its core material composed of soft sponge rubber and its sleeve or shell material composed of hard plastic. Such a damper has an internal bore of less than 0.1" and an outside diameter of about 1.0" to about 1.4." The sleeve of such a damper has a thickness of about 0.1" to 0.3." In a similar way, a damper satisfactory for use with power lines which normally have wire diameters of about 0.2" to about 0.5" would have a resonance frequency of about 15 c.p.s. A damper satisfactory for use with smaller diameter power wires would have its core material composed of soft rubber and a sleeve or shell material composed of hard rubber. Such a damper would have an internal bore of less than 0.2" and an outside diameter of about 2" to about 4." The sleeve of such a damper would have a thickness of about 0.5." In all cases, the exact dimension to be chosen depends upon the characteristics of the materials, such as the modulus of elasticity of the core material.

From the foregoing description of the invention, it is apparent that we have provided an improved system for damping vibrations of wires of telephone lines and power lines which is especially effective at wind velocities in the range above about four miles per hour, where the dampers of this invention are of simple, inexpensive construction. Since, in accordance with this invention, dampers need not be tuned to specific frequencies corresponding to individual wire diameters, individual span lengths, and particular wind velocities, they can be used on transmisison lines of widely different wire diameters under widely different wind conditions. It will be understood, of course, that the invention is not limited to the specific embodiments thereof which have been disclosed herein, but that the invention may be embodied in many other forms in the art. More particularly, it will be understood that the dimensions of the parts of the damper and the materials of which they are composed may be modified in many ways without departing from the principles of the invention as embodied in dampers defined by the claims.

The invention claimed is:

1. In combination:

a suspended wire line subject to wind velocities, said wire having a diameter $d$, and a damper freely mounted on such line between the points of suspension, said damper including a rigid solid body structure containing therein a soft filler structure embracing said wire, said body structure resiliently engaging said filler structure and forming a vibratory system therewith, the mechanical properties of said solid body structure and said filler structure being such that said damper has a natural frequency $F_n$ related to the diameter of the wire by the inequality $$F_n < \frac{40}{d}$$

said natural frequency of the damper being less than about three times the frequency excited in the wire line under the action of a wind velocity of about four miles per hour.

2. In combination:

a suspended wire line subject to wind velocities;

and a damper hanging on such line, said damper including a rigid outer shell containing therein a soft filler structure mounted concentrically upon and supported by said line, said shell and said filler structure being of about the same length, the mass constant M of the shell in pounds-per-inch length of the damper, the spring constant K of the filler structure in pounds force/in.² and the diameter $d$ of the wire in inches being related by the following equations:

$$F_n = 3.13\sqrt{\frac{K}{M}}$$

and $$F_c = \frac{13}{d}$$

$$F_n < F_c$$

wherein $F_n$ is the natural frequency of the damper, and wherein $F_c$ is the frequency excited in the wire line under action of a wind that has a component of velocity normal to the wire line, which component has a magnitude of about four miles per hour.

3. A combination as in claim 2 wherein the modulus of elasticity of said filler structure is below about 1,000 lbs./in.².

4. A damper for mounting on a wire of a transmission line comprising a rigid outer cylindrical shell containing a soft resilient cylindrical core, a hollow bore extending axially along the center of said core and having a diameter $x$, said core being adapted to grip such a wire within said bore without establishing a solid connection between said wire and said shell than that provided by said core, the outer diameter of said core being at least about three to seven times the diameter of said bore, the modulus of elasticity of said core being less than about 1,000 lbs./in.², the resonance frequency of said damper in the mode of vibration transverse to its axis being less than about $40/x$.

References Cited by the Examiner

UNITED STATES PATENTS

| | | | |
|---|---|---|---|
| 328,728 | 10/1885 | Smith | 174—147 |
| 1,671,659 | 5/1928 | Varney | 174—42 |
| 1,929,700 | 10/1933 | Malone | 174—42 X |
| 2,275,019 | 3/1942 | Peterson | 174—42 X |
| 2,969,416 | 1/1961 | McGavern | 174—42 |

FOREIGN PATENTS

| | | |
|---|---|---|
| 543,130 | 2/1932 | Germany. |
| 644,628 | 5/1937 | Germany. |
| 331,220 | 10/1935 | Italy. |

ROBERT K. SCHAEFER, *Acting Primary Examiner.*

E. JAMES SAX, BENNETT G. MILLER, JOHN P. WILDMAN, DARRELL L. CLAY, JOHN F. BURNS.
*Examiners.*